United States Patent
Smith et al.

(10) Patent No.: US 9,942,365 B2
(45) Date of Patent: Apr. 10, 2018

(54) SEPARATION AND ISOLATION OF MULTIPLE NETWORK STACKS IN A NETWORK ELEMENT

(71) Applicants: Albert V. Smith, Richardson, TX (US); Nasir Iqbal Amanullah, Richardson, TX (US); Bradford J. Dobson, Richardson, TX (US); Tintooda Nakakes, Richardson, TX (US); Steven M. Simmons, Richardson, TX (US)

(72) Inventors: Albert V. Smith, Richardson, TX (US); Nasir Iqbal Amanullah, Richardson, TX (US); Bradford J. Dobson, Richardson, TX (US); Tintooda Nakakes, Richardson, TX (US); Steven M. Simmons, Richardson, TX (US)

(73) Assignee: Fujitsu Limited, Kawasaki (JP)

( * ) Notice: Subject to any disclaimer, the term of this patent is extended or adjusted under 35 U.S.C. 154(b) by 117 days.

(21) Appl. No.: 14/222,474

(22) Filed: Mar. 21, 2014

(65) Prior Publication Data
US 2015/0271304 A1    Sep. 24, 2015

(51) Int. Cl.
*H04L 29/08* (2006.01)
*H04L 12/24* (2006.01)

(52) U.S. Cl.
CPC .............. *H04L 69/30* (2013.01); *H04L 41/50* (2013.01); *H04L 67/1097* (2013.01)

(58) Field of Classification Search
CPC ...... H04L 45/22; H04L 47/2483; H04L 45/00
See application file for complete search history.

(56) References Cited

U.S. PATENT DOCUMENTS

| | | | |
|---|---|---|---|
| 7,739,360 B2 | 6/2010 | Watson et al. | 709/220 |
| 8,010,637 B2 | 8/2011 | Watson et al. | 709/220 |
| 8,111,690 B2 | 2/2012 | Hussain et al. | 370/389 |
| 8,554,901 B2 | 10/2013 | Allan | 709/223 |
| 2003/0169859 A1* | 9/2003 | Strathmeyer | H04L 29/06027 379/88.17 |
| 2006/0146991 A1* | 7/2006 | Thompson | G06F 9/542 379/67.1 |
| 2009/0037641 A1* | 2/2009 | Bresniker | G06F 13/1694 711/100 |
| 2012/0120811 A1* | 5/2012 | Varadhan | H04L 43/10 370/244 |

(Continued)

OTHER PUBLICATIONS

6WIND Blog, "Implementing Virtual Routing on Multicore CPUs (Part 2/2)", Online http://www.6wind.com/blog/implementing-virtual-routing-on-multicore-cpus-part-22/, 2012.

*Primary Examiner* — Huy D Vu
*Assistant Examiner* — Bao G Nguyen
(74) *Attorney, Agent, or Firm* — Baker Botts L.L.P.

(57) ABSTRACT

Separating and isolating multiple network stacks in a network element may enable a network element to simultaneously operate within multiple forwarding planes respectively corresponding to the multiple network stacks. In addition to the network stack, other protocols and routing tools may also be instantiated for each desired forwarding plane. The different instantiations of the network stacks may be executed in parallel in respective memory spaces that are distinct and separate. In this manner, each forwarding plane may operate independently on the network element from other forwarding planes.

13 Claims, 4 Drawing Sheets

(56) References Cited

U.S. PATENT DOCUMENTS

| | | | |
|---|---|---|---|
| 2012/0297043 A1* | 11/2012 | Davis | H04L 45/60 709/223 |
| 2014/0280834 A1* | 9/2014 | Medved | H04L 47/122 709/223 |
| 2015/0149658 A1* | 5/2015 | Wei | G06F 8/67 709/242 |
| 2015/0271304 A1* | 9/2015 | Smith | H04L 69/30 370/389 |

* cited by examiner

SEPARATION AND ISOLATION OF MULTIPLE NETWORK STACKS IN A NETWORK ELEMENT

BACKGROUND

Field of the Disclosure

The present disclosure relates to communication networks, and more specifically, to separation and isolation of multiple network stacks in a network element.

Description of the Related Art

A communication network may include network elements that route packets through the network. Some network elements may include a distributed architecture, wherein packet processing may be distributed among several sub-systems of the network element (e.g., line cards). Thus, network elements may be modular and may include various sub-systems and/or sub-elements, which may include a shelf, a slot, a port, a channel and/or various combinations thereof.

In a communication network, multiple network forwarding planes may exist within a single physical network that includes a network element. The forwarding planes may handle different kinds of traffic, such as a management plane for management control packets (also referred to as a management control network (MCN)) and a control plane for signal control packets (also referred to as a signal control network (SCN)), among other types of forwarding planes. A network element may thus have the responsibility for maintaining multiple forwarding tables corresponding to the multiple forwarding planes and then selecting the correct forwarding table upon receiving and routing a network packet.

One typical implementation of multiple forwarding planes alters the forwarding code within a single operating system memory space while relying on additional data fields to parameterize each forwarding plane, for example, in each forwarding table. However, such customized changes to forwarding code, which may alter the forwarding logic of a single network stack, may be complex to implement and maintain over time. Also, the execution of multiple forwarding planes within the single memory space of the single network stack may bring certain architectural disadvantages, such as dependencies and/or undesired interaction of one forwarding plane on another forwarding plane that is executing concurrently.

BRIEF DESCRIPTION OF THE DRAWINGS

For a more complete understanding of the present invention and its features and advantages, reference is now made to the following description, taken in conjunction with the accompanying drawings, in which.

SUMMARY

Figure 1:
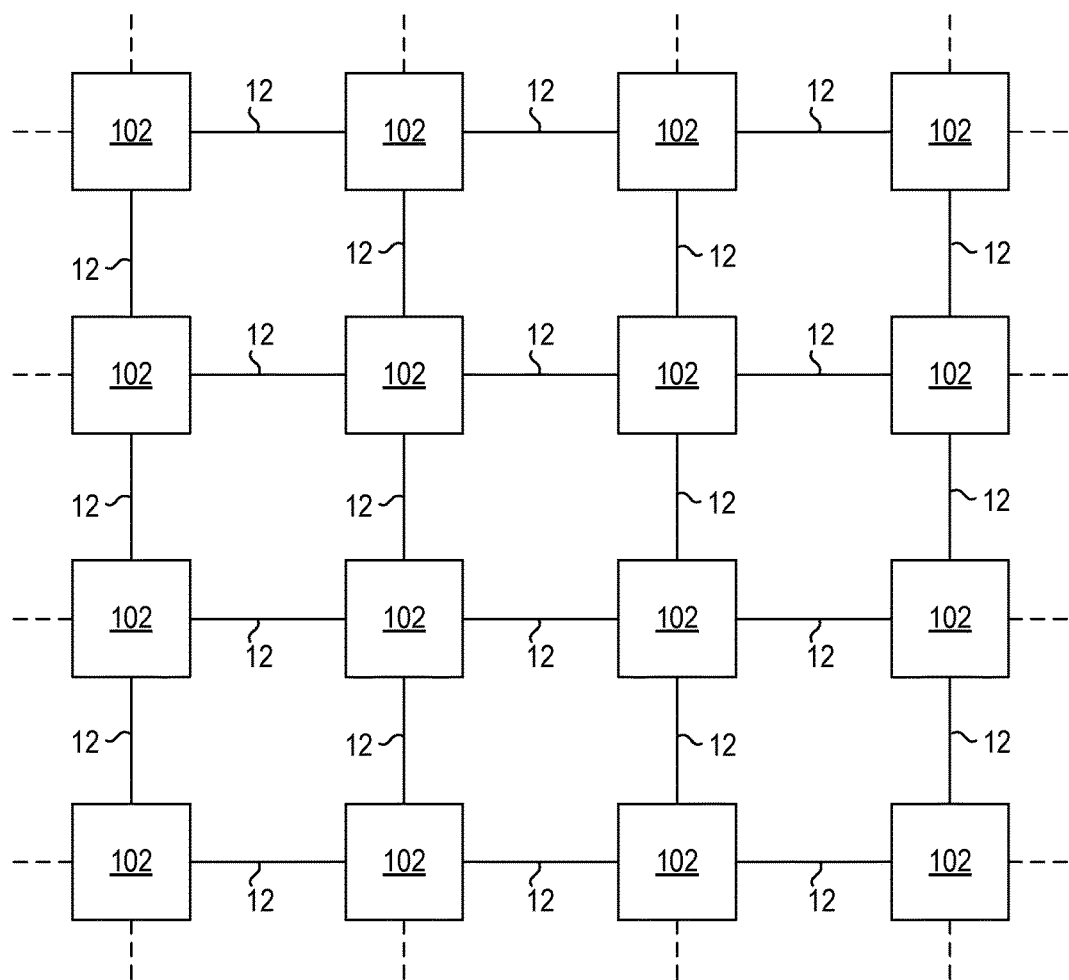
FIG. 1 is a block diagram of selected elements of an embodiment of a network.

In one aspect, a disclosed method for using at least two network stacks in a network element includes receiving a first packet at the network element and processing the first packet using a first network stack installed on the network element. The first network stack may execute in a first memory space. The method may include receiving a second packet at the network element and processing the second packet using a second network stack installed on the network element. The second network stack may execute in a second memory space. The first memory space and the second memory space may be different memory spaces.

Additional disclosed aspects for using at least two network stacks in a network element include a network element and an article of manufacture comprising non-transitory computer readable memory media storing processor-executable instructions.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget 12-1 refers to an instance of a widget class, which may be referred to collectively as widgets 12 and any one of which may be referred to generically as a widget 12.

Turning now to the drawings, FIG. 1 is a block diagram showing selected elements of an embodiment of network 100. In certain embodiments, network 100 may be an Ethernet network. Network 100 may include one or more transmission media 12 operable to transport one or more signals communicated by components of network 100. The components of network 100, coupled together by transmission media 12, may include a plurality of network elements 102. In the illustrated network 100, each network element 102 is coupled to four other nodes. However, any suitable configuration of any suitable number of network elements 102 may create network 10. Although network 100 is shown as a mesh network, network 100 may also be configured as a ring network, a point-to-point network, or any other suitable network or combination of networks. Network 10 may be used in a short-haul metropolitan network, a long-haul inter-city network, or any other suitable network or combination of networks.

Each transmission medium 12 may include any system, device, or apparatus configured to communicatively couple network devices 102 to each other and communicate information between corresponding network devices 102. For example, a transmission medium 12 may include an optical fiber, an Ethernet cable, a T1 cable, a WiFi signal, a Bluetooth signal, and/or other suitable medium.

Network 100 may communicate information or "traffic" over transmission media 12. As used herein, "traffic" means information transmitted, stored, or sorted in network 100. Such traffic may comprise optical or electrical signals configured to encode audio, video, textual, and/or any other suitable data. The data may also be transmitted in a synchronous or asynchronous manner, and may be transmitted deterministically (also referred to as 'real-time') and/or stochastically. Traffic may be communicated via any suitable communications protocol, including, without limitation, the Open Systems Interconnection (OSI) standard and Internet Protocol (IP). Additionally, the traffic communicated via network 100 may be structured in any appropriate manner including, but not limited to, being structured in frames, packets, or an unstructured bit stream.

Each network element 102 in network 100 may comprise any suitable system operable to transmit and receive traffic. In the illustrated embodiment, each network element 102 may be operable to transmit traffic directly to one or more other network elements 102 and receive traffic directly from the one or more other network elements 102. Network elements 102 will be discussed in more detail below with respect to FIG. 2.

Modifications, additions, or omissions may be made to network 100 without departing from the scope of the disclosure. The components and elements of network 100 described may be integrated or separated according to particular needs. Moreover, the operations of network 100 may be performed by more, fewer, or other components.

In operation, as will be described in further detail herein, network elements 102 may instantiate at least two network stacks in different memory spaces. The separate network stacks may be executed independently by at least one processor and/or at least one processor core, such that each individual network stack may consume processor resources independently of another network stack. In some embodiments, network elements 102 may include physically different transmission media, such as embodiments of transmission medium 12, for each instantiated network stack. In various embodiments, network elements 102 may be configured with separate virtual local area networks (VLANs) corresponding to the network stack instances. By using VLANs, a common physical transmission media in an internal network within network element 102 may be used for all network stacks, while traffic corresponding to each instantiated network stack may flow independently of other network stacks. For example, one VLAN in a network element may be dedicated to management control forwarding plane (i.e., MCN) while another VLAN may be dedicated to a signal control forwarding plane (i.e., SCN).

Figure 2:
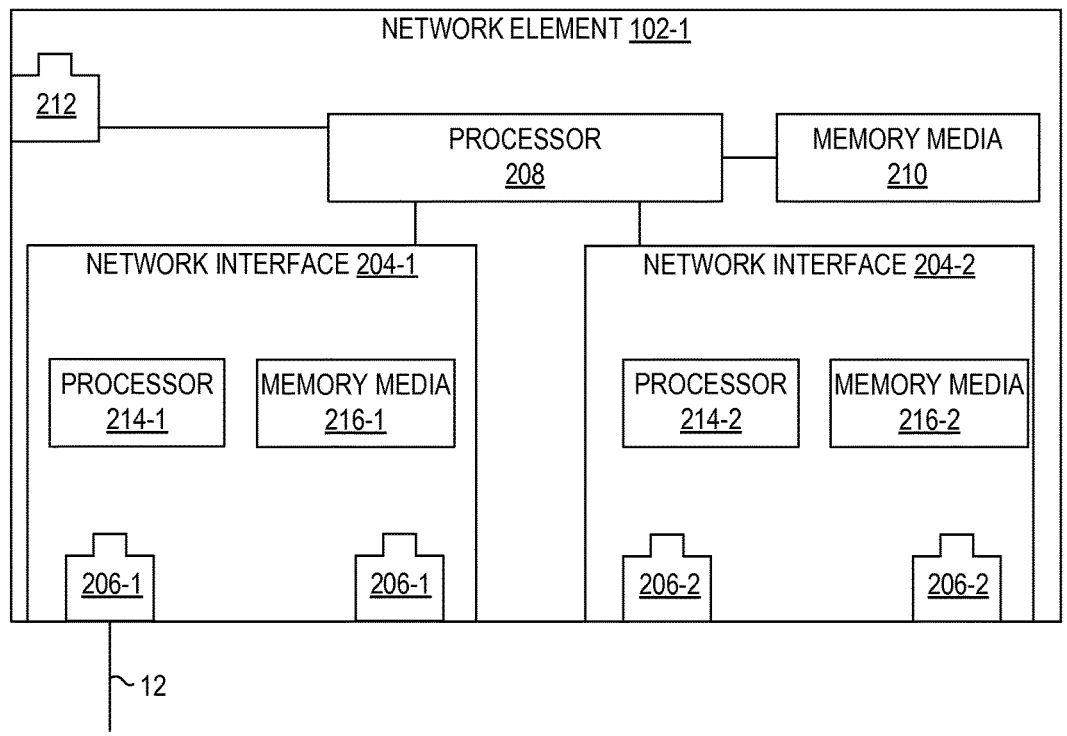
FIG. 2 is a block diagram of selected elements of an embodiment of a network element.

Referring now to FIG. 2, a block diagram of selected elements of an embodiment of network element 102-1, which is represented as a particular embodiment of network elements 102 for descriptive purposes, is illustrated. Network element 102-1, as shown, includes processor 208 and memory media 210, and external port 212, along with network interface 204-1 having ports 206-1 and network interface 204-2 having ports 206-2. External port 212 may be used by processor 208 to communicate with neighbor network elements (see FIG. 1).

As depicted in FIG. 2, each network element 102 may include processor 208 and memory media 210 that may store instructions executable by processor 208. Processor 208 may include a single processing unit (e.g., a core) or may include multiple processing units (not shown). In certain embodiments, processor 208 may represent a multi-processor subsystem in which each individual processor includes one or more processing units. The individual processors and/or processing units may provide processing resources, such as a processing frequency, messaging, instruction queuing, memory caching, virtual memory, among others, to process instructions and/or code. As shown, memory media 210 may represent volatile, non-volatile, fixed, and/or removable media, and may be implemented using magnetic and/or semiconductor memory. Memory media 210 is capable of storing instructions (i.e., code executable by processor 208) and/or data. Memory media 210 and/or at least a portion of contents of memory media 210 may be implemented as an article of manufacture comprising non-transitory computer readable memory media storing processor-executable instructions. Memory media 210 may store instructions including an operating system (OS), which may be any of a variety of operating systems, such as a UNIX variant, LINUX, a Microsoft Windows® operating system, or a different operating system.

In FIG. 2, network elements 102 are shown including at least one network interface 204, which provides a plurality of ports 206 that receive a corresponding transmission media 12 (see also FIG. 1). Ports 206 and transmission media 12 may represent galvanic and/or optical network connections. Each network interface 204 may include any suitable system, apparatus, or device configured to serve as an interface between a network element 102 and transmission medium 12. Each network interface 204 may enable its associated network element 102 to communicate with other network elements 102 using any of a variety of transmission protocols and/or standards. Network interface 204 and its various components may be implemented using hardware, software, or any combination thereof. In certain embodiments, network interfaces 204 may include a network interface card. In various embodiments, network interfaces 204 may include a line card. Each port 206 may include a system, device or apparatus configured to serve as a physical interface between corresponding transmission medium 12 and network interface 204. In some embodiments, port 206 may comprise an Ethernet port. Although in FIG. 2 network interfaces 204 are shown with 2 instances of ports 206 for descriptive clarity, in different embodiments, network interfaces 204 may be equipped with different numbers of ports 206 (e.g., 4, 6, 8, 16 ports, etc.).

As shown in FIG. 2, network interfaces 204 may include respective processors 214 and memory media 216, which may store and execute instructions and may be implemented in a similar manner as described above with respect to processor 208 and memory media 210, respectively. In various embodiments, processors 214 may execute internal instructions and operations, such as for packet routing and forwarding, and may be under control or supervision of processor 208. Furthermore, processor 208 and processor(s) 214, along with various internal and external network ports included in network element 102, may represent at least one local domain that is configured at network element 102. In some embodiments, the local domains include at least one VLAN domain.

In various embodiments, network element 102 may be configured to receive data and route such data to a particular network interface 204 and/or port 206 based on analyzing the contents of the data and/or based on a characteristic of a signal carrying the data (e.g., a wavelength and/or modulation of the signal). In certain embodiments, network element 102 may include a switching element (not shown) that may include a switch fabric (SWF).

As noted previously, network element 102 may instantiate multiple instances of a network stack corresponding to different forwarding planes. Specifically, memory media 210 and/or memory media 216 may store a first network stack in a first memory space, while storing a second network stack in a second memory space. The first and second memory spaces may be different memory spaces such that the first and second network stacks are independently configured and executed by processor 208 and/or processor 214, respectively. The independent execution of the first network stack and the second network stack may include usage of processor resources on a given processor by a network stack that is independent of processor resource usage by another network stack. An operating system task/ process mechanism (not shown) may be employed to load each of the first network stack and the second network stack in the first memory space and the second memory space, respectively. The use of the operating system task/process mechanism may enable both the first network stack and the second network stack to be instantiated from a common code source.

The first and second network stacks may be respectively associated with a first local VLAN and a second local VLAN (not shown), which may respectively correspond to a first forwarding plane and a second forwarding plane. The first forwarding plane may be an MCN, while the second forwarding plane may be an SCN. In this manner, for example, the MCN may be instantiated on network element 102 using a first network stack dedicated to the MCN, while the SCN may be instantiated on network element 102 using a second network stack dedicated to the SCN. The first and second network stacks may be separate instances of the same network stack, or may be different network stacks. In this manner, separate forwarding planes may be independently configured and operated on network element 102 with separate performance tuning, separate priorities, separate memory usage, and separate traffic profiles, as desired.

Figure 3:
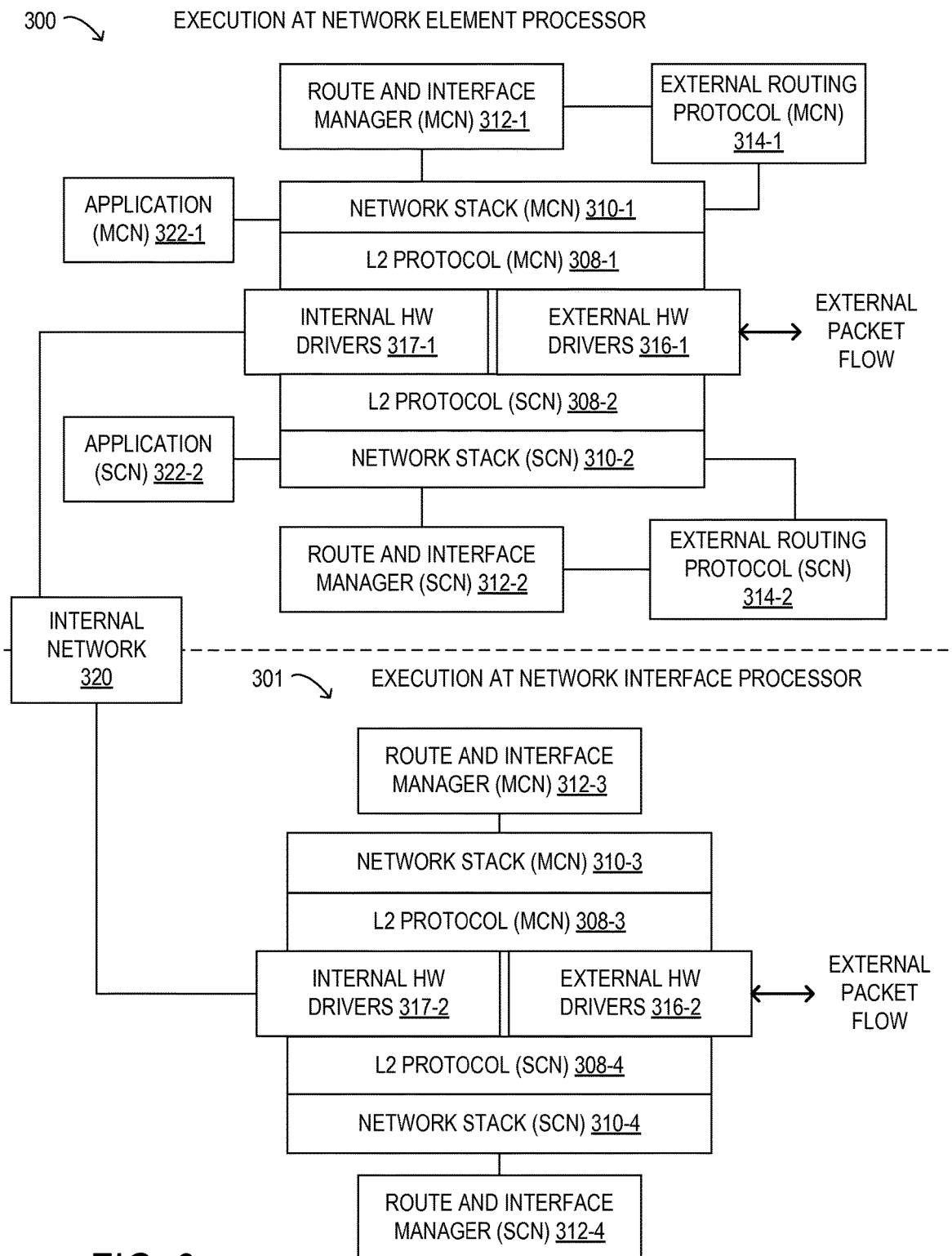
FIG. 3 is a block diagram of selected elements of a network architecture in a network element.

Referring now to FIG. 3, a diagram depicts selected elements of an embodiment of a network architecture for execution on a network element, such as network element 102 (see FIGS. 1 and 2). Specifically, in FIG. 3, network architecture 300 illustrates execution at a network element processor, such as processor 208 (see FIG. 2), while network architecture 301 illustrates execution at a network interface processor, such as processor 214 (see FIG. 2). It is noted that although network architecture 300 is shown with one instance of network architecture 301, it will be understood that network architecture 301 may be replicated for multiple instances of network interfaces 204 included within network element 102. Also, although network architectures 300 and 301 are described below in an implementation of two separate forwarding planes (MCN and SCN), it is noted that different numbers of forwarding planes greater than two may also be implemented in various embodiments.

In FIG. 3, network architecture 300 is shown including modules or code elements that may be executed at a network element processor having access to memory media. In one embodiment, network architecture 300 represents a collection of executable instructions stored in memory media 210 and executed by processor 208 (see FIG. 2). As shown in network architecture 300, certain modules may be instantiated once for a first forwarding plane (i.e., MCN) and may be instantiated a second time for a second forwarding plane (i.e., SCN). As noted above, the two instantiations for MCN and SCN for a given module shown in network architecture 300 may be executed from different memory spaces, such that the instantiations are independent of one another. The two instantiations for MCN and SCN in network architecture 300 may thus consume processor resources independently of each other.

In network architecture 300 of FIG. 3, application 322 may represent a top level application, such as a user interface, along with other associated programs and related data, which may serve as a source or a sink for packets processed by a network element. Examples of application 322-1 in MCN include telnet, ftp, SNMP, among others, which represent tools for managing a network element, including functionality for activation, monitoring, alarm handling, statistical analyses of performance and/or other operational characteristics. Examples of application 322-2 in SCN include a control plane protocol, and code to instantiate a software-defined network (SDN), such as using an Open-Flow SDN protocol and/or another SDN protocol. When application 322 is loaded and initialized, for example, by an operating system, an operating system task/process mechanism may identify a particular instance of application 322 as belonging to MCN/SCN, such that each instance of application 322 is associated by the operating system with either the first network stack or the second network stack. Then, when an operating system trap occurs for a task/process associated with the instance of application 322, the corresponding network stack may be identified by the operating system for further processing.

As shown in network architecture 300 of FIG. 3, route and interface manager 312 may operate to facilitate internal routing within the network element and may distribute routing information for this purpose. For example, route and interface manager 312 may communicate with network interfaces included within the network element using internal network 320. External routing protocol 314 may operate to facilitate external routing between the network element and external network nodes and may collect and maintain routing information for this purpose. For example, external routing protocol 314 may generate a routing table for a physical network of which the network element is a part. External routing protocol 314 may communicate via neighbor network element using external port 212 (see FIG. 2). Network stack 310 may represent a network stack that receives and forwards packets, performs routing lookup using forwarding tables, routes packets to destinations, and terminates packets, among other functionality. Examples of network protocols implemented by network stack 310 include Internet-protocol version 4, Internet-protocol version 6, and Open Systems Interconnection (OSI) protocols. L2 protocol 308 may represent an instance of OSI level 2 protocol, such as, for example, Ethernet or Point-to-Point Protocol PPP, among others. L2 protocol 308 may access internal hardware (HW) drivers 317 using a first protocol for communication with internal elements via internal network 320, and may access external nodes, such as neighboring node network elements (not shown) using a second protocol via external HW drivers 316. The first protocol and the second protocol used by L2 protocol 308 may be different protocols or may be the same protocol. Also, internal HW drivers 317 may represent functionality to interface with internal physical network ports (not shown) represented by internal network 320 for enabling internal communication among processor 208 and processor(s) 214. Internal network 320 may represent internal networking components, such as ports, switches, interconnection fabric, etc. within the network element. In certain embodiments, internal network 320 may include a link node handler (not shown) for setup and/or operation without a network stack.

In FIG. 3, network architecture 300 may represent execution at a master control unit (MCU) of which a single instance may be included in the network element. In network architecture 300, MCN instantiations for a first forwarding plane may include L2 protocol (MCN) 308-1, network stack (MCN) 310-1, external routing protocol (MCN) 314-1, route and interface manager (MCN) 312-1, and/or application (MCN) 322-1. In network architecture 300, SCN instantiations for a second forwarding plane may include L2 protocol (SCN) 308-2, network stack (SCN) 310-2, external routing protocol (SCN) 314-2, route and interface manager (SCN) 312-2, and/or application (SCN) 322-2. Although shown in network architecture 300 as a common instantiation for both MCN and SCN, internal HW drivers 317-1 and external HW drivers 316-1 may also be respectively implemented as separate instantiations for MCN and SCN in different embodiments (not shown). External HW drivers 316-1 may provide a software interface for accessing external port 212 (see FIG. 2).

In FIG. 3, network architecture 301 may represent an instance of each respective network interface included in the network element. In network architecture 302, MCN instantiations for the first forwarding plane may include L2 protocol (MCN) 308-3, network stack (MCN) 310-3, and/or route and interface manager (MCN) 312-3. In network architecture 302, SCN instantiations for the second forwarding plane may include L2 protocol (SCN) 308-4, network stack (SCN) 310-4, and/or route and interface manager (SCN) 312-4. Although shown in network architecture 301 as a common instantiation for both MCN and SCN, internal HW drivers 317-2 and external HW drivers 316-2 may also be respectively implemented as separate instantiations for MCN and SCN in different embodiments (not shown). External HW drivers 316-2 may provide a software interface for accessing ports 206 (see FIG. 2).

During provisioning of network architecture 300 and/or network architecture 301, the MCN may be configured as a first domain, while the SCN may be configured as a second domain, which may both be local network element domains. The first domain and the second domain may thus concurrently exist on internal network 320 but may be logically and/or physically separated using various means. For example when the first domain and the second domain are VLAN domains, VLAN tagging of packets may be used to identify and separate traffic associated with each respective VLAN domain. The VLAN tagging of corresponding MCN and SCN packets may be used to automatically route MCN and SCN packets to respective instances of MCN/SCN modules shown with respect to network architecture 300 and/or network architecture 301. When the first domain and the second domain are implemented as physically different transmission media, different network addresses and/or separate internal routing paths may serve to segregate traffic at the physical layer. In particular embodiments, other methods and/or combinations of methods may be used to segregate traffic from the first domain and the second domain.

In operation, for example, an incoming packet may be externally received at external HW drivers 316 and may be classified as a master control packet (MCN) or a signal control packet (SCN) based on network addressing (i.e., VLAN tags). Based on the MCN/SCN classification, the packet may then be processed and routed using the corresponding MCN/SCN modules that have been separately instantiated, as described above. Incoming packets terminating at the network element may be routed to application 322, while incoming packets destined to be output at a port of the network element may be internally routed to a corresponding network interface processor (i.e., processor 214) via the network element processor (i.e., processor 208). In this manner, two completely separate forwarding planes may be instantiated on the network element, including two separate instantiations of network stack 310, and may be operated concurrently. As a result of network architectures 300 and 301, each of the two forwarding planes may execute substantially independently of one another and may be provisioned using duplicate instances of standard components, as desired.

Figure 4:
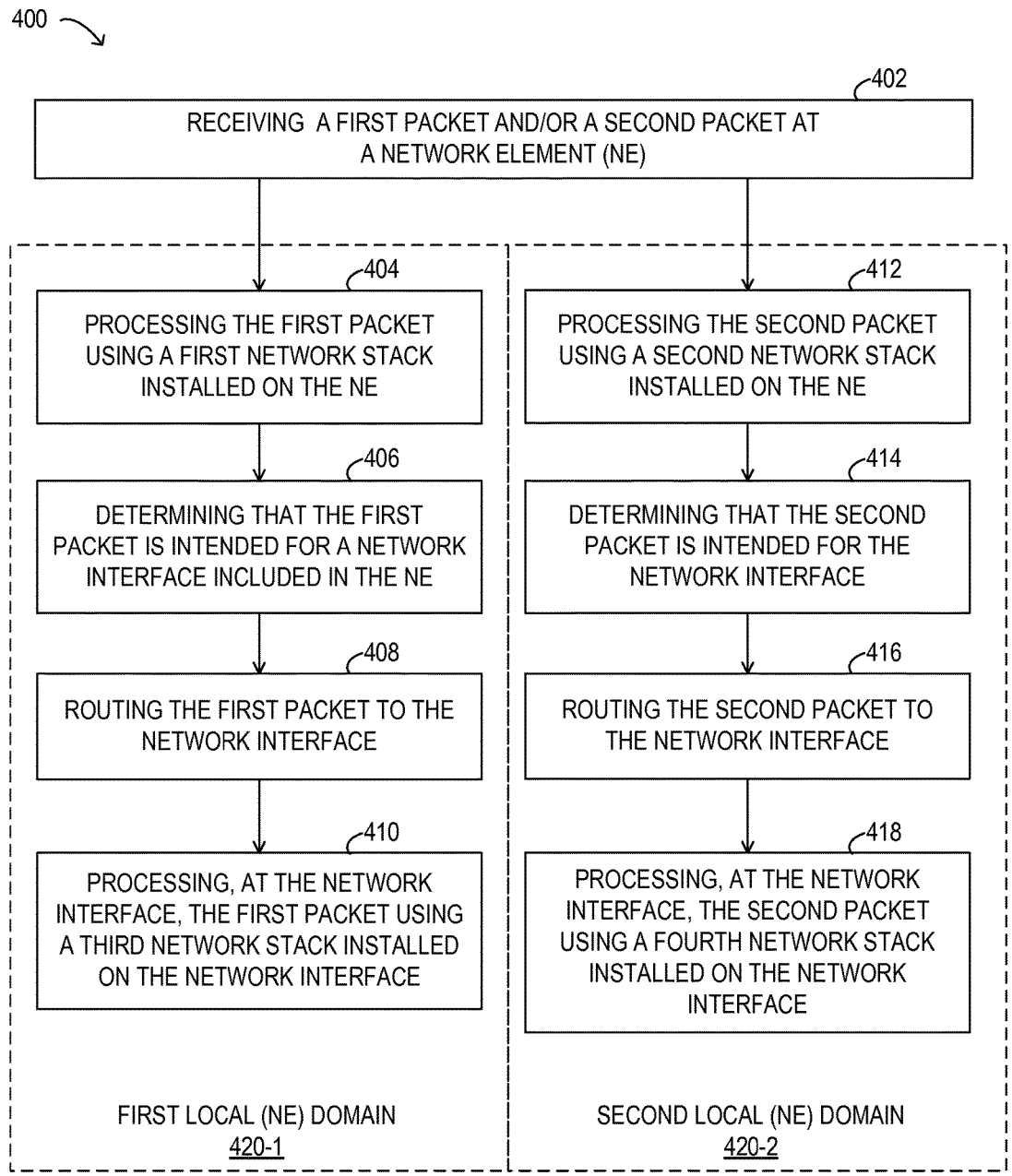
FIG. 4 is a flow chart depicting selected elements of an embodiment of a method for separating and isolating multiple network stacks in a network element.

Turning now to FIG. 4, a block diagram of selected elements of an embodiment of method 400 for separating and isolating multiple network stacks in a network element, as described herein. Method 400 may be performed using network element 102 (see FIGS. 1 and 2). It is noted that certain operations described in method 400 may be optional or may be rearranged in different embodiments. As described below with respect to method 400, a first network stack may represent an instance of an MCN network stack on a network element processor (i.e., MCU); a second network stack may represent an instance of an SCN network stack on the network element processor (MCU); a third network stack may represent an instance of an MCN network stack on a network interface processor (i.e., a line card); and a fourth network stack may represent an instance of an SCN network stack on the network interface processor (line card).

In FIG. 4, method 400 may begin by receiving (operation 402) a first packet and/or a second packet at a network element. The first packet and the second packet may represent examples of incoming packets respectively associated with the two forwarding planes (MCN, SCN) and may be received at different times. In other words, operation 402 may involve receiving the first packet, receiving the second packet, or receiving both the first and the second packet. After receiving the first packet, method 400 may process (operation 404) the first packet using a first network stack installed on the network element. Method 400 may then determine (operation 406) that the first packet is intended for a network interface included in the network element. The first packet may then be routed (operation 408) to the network interface. At the network interface, the first packet may be processed (operation 410) using a third network stack installed on the network interface. As shown, operations 404, 406, 408, and 410 may be performed within first local network element domain 420-1, which may be, for example, an MCN. In other words, the routing and processing of the first packet may be within MCN instances of network architectures 300 and 301 (see FIG. 3).

In method 400, after receiving the second packet, method 400 may process (operation 412) the second packet using a second network stack installed on the network element. Method 400 may then determine (operation 414) that the second packet is intended for the network interface. The second packet may then be routed (operation 416) to the network interface. At the network interface, the second packet may be processed (operation 418) using a fourth network stack installed on the network interface. As shown, operations 412, 414, 416, and 418 may be performed within second local network element domain 420-2, which may be, for example, an SCN. In other words, the routing and processing of the second packet may be within SCN instances of network architectures 300 and 301 (see FIG. 3).

As noted previously with respect to FIG. 3, although operations of method 400 in FIG. 4 within second local network element domain 420-2 are described for a single network interface processor (line card), it is noted that second local network element domain 420-2 may extend over a plurality of line cards and corresponding network interface processors. For example, operation 402 may involve receipt of the second packet at a second network interface processor that is within second local network element domain 420-2 and using a fifth network stack, which is an instantiation of an SCN network stack at the second network interface processor. In this example, both the fourth network stack and the fifth network stack may represent instances of SCN network stacks, albeit on different network interface processors.

Separating and isolating multiple network stacks in a network element may enable a network element to simultaneously operate within multiple forwarding planes respectively corresponding to the multiple network stacks. In addition to the network stack, other protocols and routing tools may also be instantiated for each desired forwarding plane. The different instantiations of the network stacks may be executed in parallel in respective memory spaces that are distinct and separate. In this manner, each forwarding plane may operate independently on the network element from other forwarding planes.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for using at least two network stacks in a network element, comprising:
   receiving a first packet at the network element;
   processing the first packet using a first processor or a first processor core and a first network stack installed on the network element, wherein the first network stack executes in a first memory space and instantiates modules of a management network control forwarding plane;
   receiving a second packet at the network element;
   processing the second packet using a second processor or a second processor core and a second network stack installed on the network element, wherein the second network stack executes in a second memory space and instantiates modules of a signal control network forwarding plane, the first memory space and the second memory space are different memory spaces and the first network stack and the second network stack are executed independently of each other;
   determining that the first packet is intended for a network interface included in the network element, wherein processing the first packet includes routing the first packet to the network interface;
   processing, at the network interface, the first packet using a third network stack installed on the network interface, the third network stack associated with a first local domain that includes the first network stack;
   determining that the second packet is intended for the network interface, wherein processing the second packet includes routing the second packet to the network interface; and
   processing, at the network interface, the second packet using a fourth network stack installed on the network interface, the fourth network stack associated with a second local domain that includes the second network stack,
   wherein the third network stack executes in a third memory space and the fourth network stack executes in a fourth memory space, wherein the third memory space and the fourth memory space are different memory spaces, and wherein the first local domain and the second local domain are two different network domains.

2. The method of claim 1, wherein the first local domain and the second local domain are virtual local area network domains.

3. The method of claim 1, wherein the first local domain is a management control network, and wherein the second local domain is a signal control network.

4. The method of claim 3, wherein the signal control network is included in a software-defined network.

5. The method of claim 1, wherein at least one of the first network stack and the second network stack are Internet-protocol stacks.

6. The method of claim 1, wherein the processing the first packet using the first network stack is performed using resources of the first processor or first processor core, and the processing the second packet using the second network stack is performed using resources of the second processor or second processor core, wherein the resources of the first processor or first processor core and the resources of the second processor or second processor operate independently of each other.

7. A network element using at least two network stacks, comprising:
   a port for receiving a first packet and a second packet;
   a first processor or a first processor core for processing the first packet using a first network stack executing in a first memory space and instantiating modules of a management network control forwarding plane, processing the first packet includes determining that the first packet is intended for a network interface included in the network element, routing the first packet to the network interface, and processing the first packet using a third network stack installed in a third memory space, the third network stack associated with a first local domain that includes the first network stack; and
   a second processor or a second processor core for processing the second packet using a second network stack executing in a second memory space and instantiating modules of a signal control network forwarding plane, processing the second packet includes determining that the second packet is intended for the network interface, routing the second packet to the network interface, and processing the second packet using a fourth network stack installed in a fourth memory space, the fourth network stack associated with a second local domain that includes the second network stack,
   wherein the first memory space and the second memory space are different memory spaces and the first network stack and the second network stack are executed independently of each other, and
   the third memory space and the fourth memory space are different memory spaces, and wherein the first local domain and the second local domain are two different network domains.

8. The network element of claim 7, wherein the first local domain and the second local domain are virtual local area network domains.

9. The network element of claim 7, wherein the first local domain is a management control network, and wherein the second local domain is a signal control network.

10. The network element of claim 9, wherein the signal control network is included in a software-defined network.

11. The network element of claim 7, wherein at least one of the first network stack and the second network stack are Internet-protocol stacks.

12. The network element of claim 7, wherein processing the first packet using the first network stack is performed using resources of the first processor or first processor core, processing the second packet using the second network stack is performed using resources of the second processor or second processor core, wherein the resources of the first processor or first processor core and the resources of the second processor or second processor operate independently of each other.

13. A method for using at least two network stacks in a network element, comprising:

receiving a first packet at the network element;

determining that a virtual local area network (VLAN) tag associated with the first packet corresponds to a management network control forwarding plane;

processing, according to the VLAN tag associated with the first packet, the first packet using a first processor or a first processor core and a first network stack installed on the network element, wherein the first network stack executes in a first memory space and instantiates modules of the management network control forwarding plane;

receiving a second packet at the network element;

determining that a VLAN tag associated with the second packet corresponds to a signal control network forwarding plane;

processing, according to the VLAN tag associated with the second packet, the second packet using a second processor or a second processor core and a second network stack installed on the network element, wherein the second network stack executes in a second memory space and instantiates modules of the signal control network forwarding plane, the first memory space and the second memory space are different memory spaces and the first network stack and the second network stack are executed independently of each other;

determining that the first packet is intended for a network interface included in the network element, wherein processing the first packet includes routing the first packet to the network interface;

processing, at the network interface, the first packet using a third network stack installed on the network interface, the third network stack associated with a first local domain that includes the first network stack;

determining that the second packet is intended for the network interface, wherein processing the second packet includes routing the second packet to the network interface; and processing, at the network interface, the second packet using a fourth network stack installed on the network interface, the fourth network stack associated with a second local domain that includes the second network stack, wherein the third network stack executes in a third memory space and the fourth network stack executes in a fourth memory space, wherein the third memory space and the fourth memory space are different memory spaces, and wherein the first local domain and the second local domain are two different network domains.

* * * * *